United States Patent [19]
Kurokawa

[11] Patent Number: 5,436,776
[45] Date of Patent: Jul. 25, 1995

[54] DISK SYSTEM HAVING A SLIDER WHICH IS CONTINUOUSLY HEATED FOR PREVENTING ORGANIC MATERIAL BUILDUP

[75] Inventor: Kaneyuki Kurokawa, Tokyo, Japan

[73] Assignee: Fujitsu Limited, Kawasaki, Japan

[21] Appl. No.: 176,677

[22] Filed: Jan. 3, 1994

Related U.S. Application Data

[63] Continuation of Ser. No. 689,573, Apr. 23, 1991, abandoned.

[30] Foreign Application Priority Data

Apr. 24, 1990 [JP] Japan .................. 2-109475

[51] Int. Cl.⁶ .................. G11B 5/60; G11B 33/14; G11B 25/04
[52] U.S. Cl. .................. 360/103; 360/97.03
[58] Field of Search .................. 360/97.02, 97.03, 109, 360/97.01, 98.01, 103, 104

[56] References Cited

U.S. PATENT DOCUMENTS

| | | | |
|---|---|---|---|
| 4,734,803 | 3/1988 | Nishihira | 360/103 |
| 4,814,908 | 3/1989 | Schmitz | 360/109 |
| 4,837,648 | 6/1989 | Yamauchi | 360/103 |
| 5,030,260 | 7/1991 | Beck et al. | 360/97.03 |
| 5,075,807 | 12/1991 | Inoue et al. | 360/97.02 |

FOREIGN PATENT DOCUMENTS

| | | | |
|---|---|---|---|
| 0140193 | 5/1985 | European Pat. Off. | |
| 0309279 | 3/1989 | European Pat. Off. | |
| 56-105377 | 8/1981 | Japan | 360/97.03 |
| 0029183 | 2/1983 | Japan | 360/97.02 |
| 0053069 | 3/1983 | Japan | 360/97.02 |
| 0085977 | 5/1983 | Japan | 360/97.03 |
| 58-94175 | 6/1983 | Japan | 360/97.02 |
| 58-105470 | 6/1983 | Japan | 360/97.02 |
| 0003381 | 1/1986 | Japan | 360/97.02 |
| 61-148691 | 7/1986 | Japan | 360/97.03 |

OTHER PUBLICATIONS

Patent Abstracts of Japan, vol. 8, No. 265 (P-318) (1702), Dec. 5, 1984, & JP-A-59 132 459, Jul. 30, 1984.
Patent Abstracts of Japan, vol. 11, No. 45 (P-546), Feb. 10, 1987, & JP-A-61 214 173, Sep. 24, 1986.
Tribology and Mechanics of Magnetic Storage Systems, vol. V (Oct. 1988).
Tribology and Mechanics of Magnetic Storage Systems, vol. VII (Oct. 1990).
"The Head Crash Induced by Liquefaction of Gases", J. Appl. Phys. 69 (8), Apr. 15, 1991.

*Primary Examiner*—John H. Wolff
*Assistant Examiner*—Jefferson Evans
*Attorney, Agent, or Firm*—Nikaido, Marmelstein, Murray & Oram

[57] ABSTRACT

In a magnetically recording disk system according to the present invention, rotation of the disk generates a higher air pressure (n atm.) at the gap between the slider supporting a head thereon and the disk surface than the ambient air pressure so as to float the slider from the disk surface. A partial pressure of a vapor recalcitrantly released, by heat of the operation of the disk, from an organic material, such as silicone, constituting the recording disk system, is kept lower than 1/n of saturated vapor pressure of the released material. The head slider may be provided with a heater to heat the slider during the disk rotation warmer than the ambient air temperature, preferably by 3° to 15° C. higher at the air gap, so that the saturated vapor pressure can be higher at the air gap than without the heating. An enclosure containing the disk, the head/slider and other constituent members is preferably provided with ventilation holes, a first one on which is provided on a side radial to the disk, and a second one on a side axial to the disk, so that the released vapor is exhausted by radial air flow caused from the disk rotation. There is no head crash resulted from a deposition or vapor recalcitrantly released from silicone, on a slider surface facing the disk. Accordingly, highly reliable magnetic disk system of enhanced recording density is achieved owing to the decreased air gap.

16 Claims, 8 Drawing Sheets

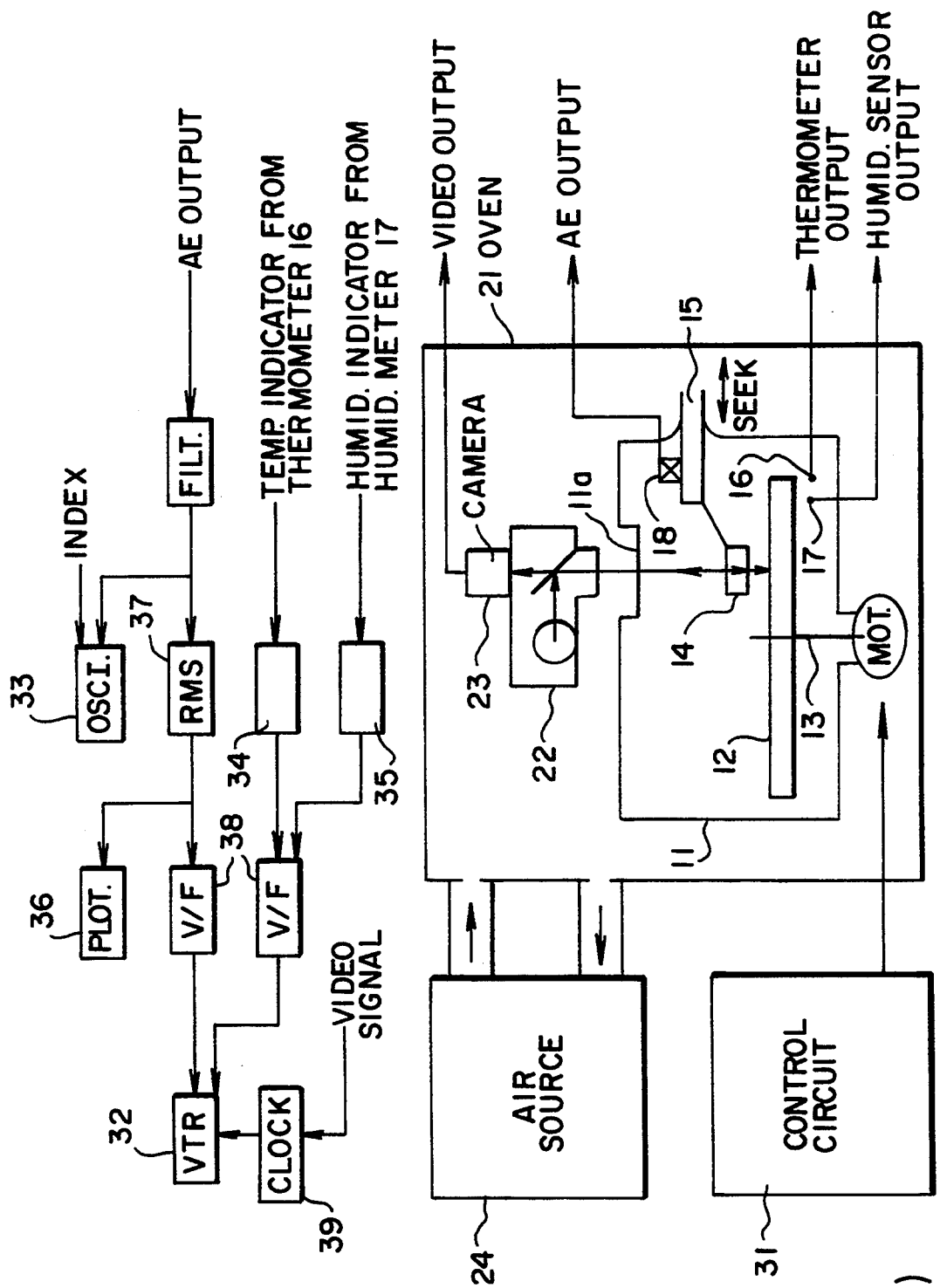

DISK SYSTEM HAVING A SLIDER WHICH IS CONTINUOUSLY HEATED FOR PREVENTING ORGANIC MATERIAL BUILDUP

This application is a continuation of application Ser. No. 07/689,573 filed Apr. 23, 1991 now abandoned.

BACKGROUND OF THE INVENTION

1. Field of the Invention

The present invention relates to a magnetically recording disk system. More particularly, it relates to a system to prevent a head crash caused from a contamination of a head slider surface due to deposition of an organic vapor recalcitrantly released from organic parts employed therein.

2. Description of the Related Arts

In order to enhance the record density of a magnetically recording disk, it has been attempted to reduce the floating height of the slider from the disk surface. Accordingly, an air gap of as narrow as below 0.1 $\mu$m floating height has been earnestly attempted. However, the smaller gap increases the probability of head contact to the disk surface, resulting in an increase in the probability of a head crash. Therefore, the most important problem is how to prevent thus caused head contact to the disk. It has long been believed that the undesirable slider touch to the disk is caused from protrusions larger than the air gap (floating height), such as foreign material or contamination introduced in the production process, or the invasion of dust, or vibration of the head and the disk.

SUMMARY OF THE INVENTION

It is a general object of the invention, therefore, to provide a magnetically recording disk system that causes no head crash as a result of a deposition of vapor recalcitrantly released from an organic member, particularly of an organic material that includes a metal element, such as silicone, on a slider surface facing the disk, due to high air pressure at the air gap between the slider and the disk surface.

It is another object of the invention to provide an enhanced recording density of a highly reliable magnetically recording disk system.

In a magnetically recording disk system according to the present invention, during rotation of the disk which generates a higher air pressure (n atm.) at the gap between the slider supporting a head thereon and the disk surface than the ambient air pressure so as to float the slider from the disk surface, a partial vapor pressure of a vapor recalcitrantly released, by heat of the operation of the disk (from an organic material, such as silicone), constituting the recording disk system, is kept lower than 1/n of the saturated vapor pressure of the released material. The head slider may be provided with a heater to heat the slider during the disk rotation warmer than the ambient air temperature, preferably by 3° to 15° C. higher at the air gap, so that the saturated vapor pressure of the contaminative vapor can be higher at the air gap than without the heating. An enclosure containing the disk, the head/slider and other constituent members are preferably provided with ventilation holes, a first one of which is provided on a side radial to the disk, and a second one on a side axial to the disk, so that the released vapor is exhausted by radial air flow generated by the disk rotation.

The above-mentioned features and advantages of the present invention, together with other objects and advantages, which will become apparent, will be more fully described hereinafter, with reference being made to the accompanying drawings which form a part thereof, wherein like numerals refer to like parts throughout.

A BRIEF DESCRIPTION OF THE DRAWINGS

Figure 3:
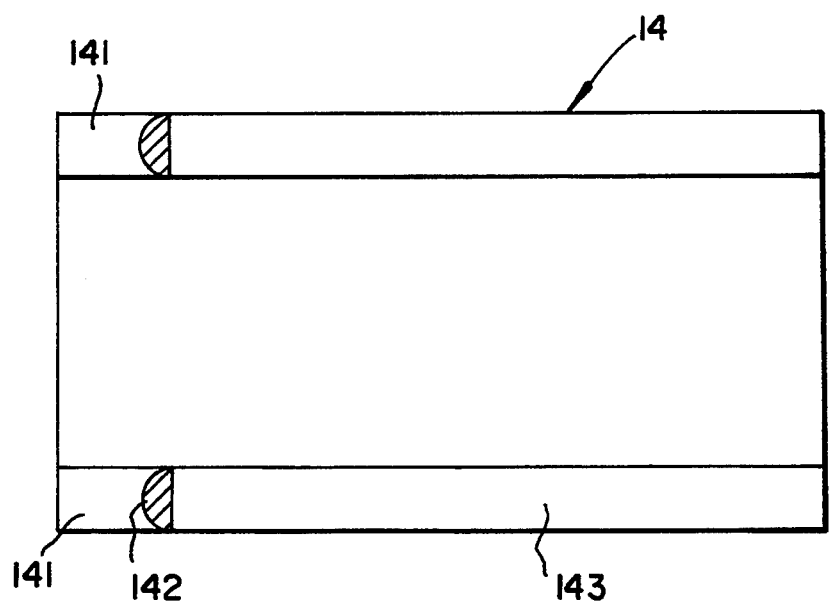
Figure 1A:
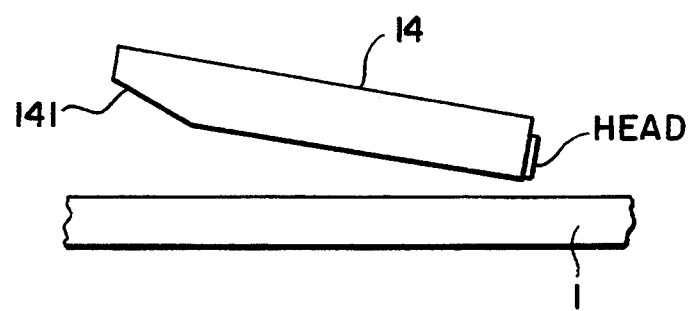
FIG. 1a shows a side view of the slider relative to a magnetic disk.
Figure 4:
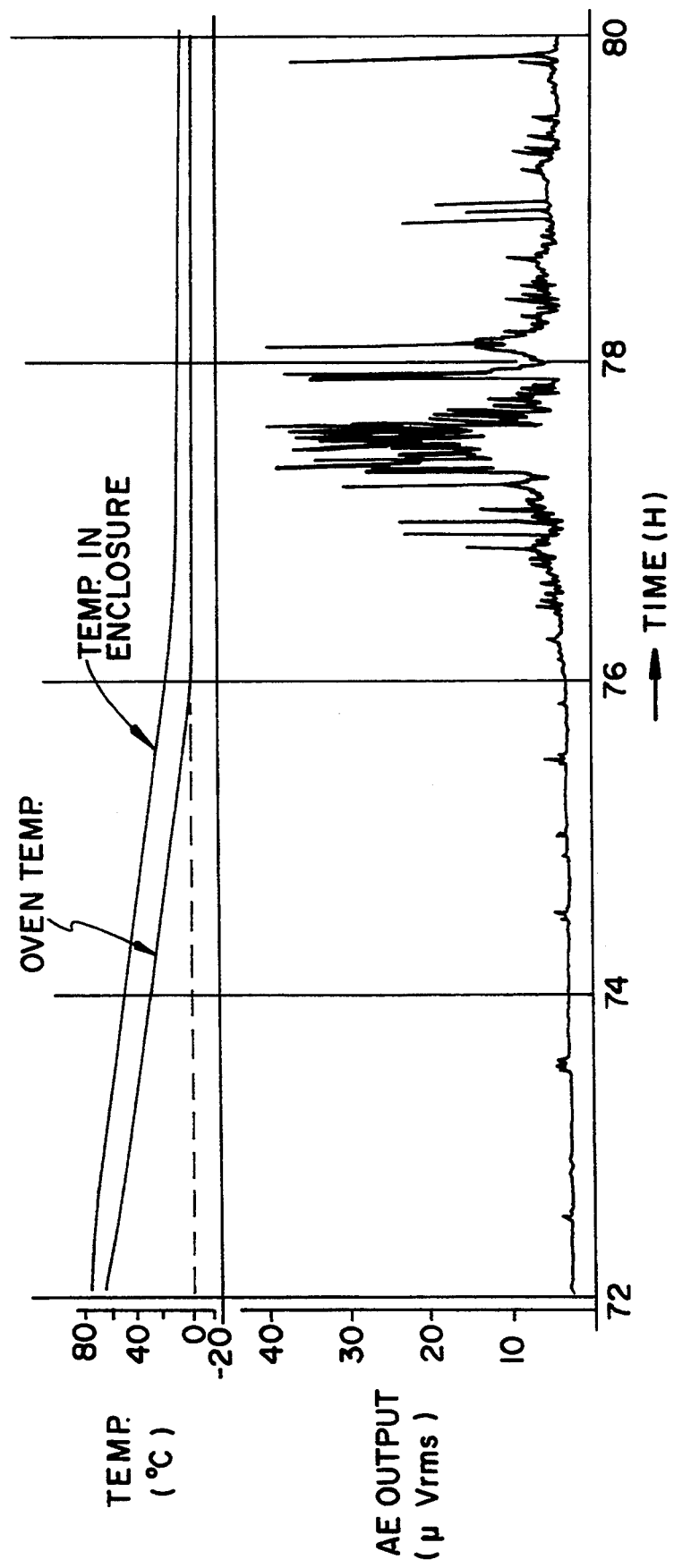
Figure 5:
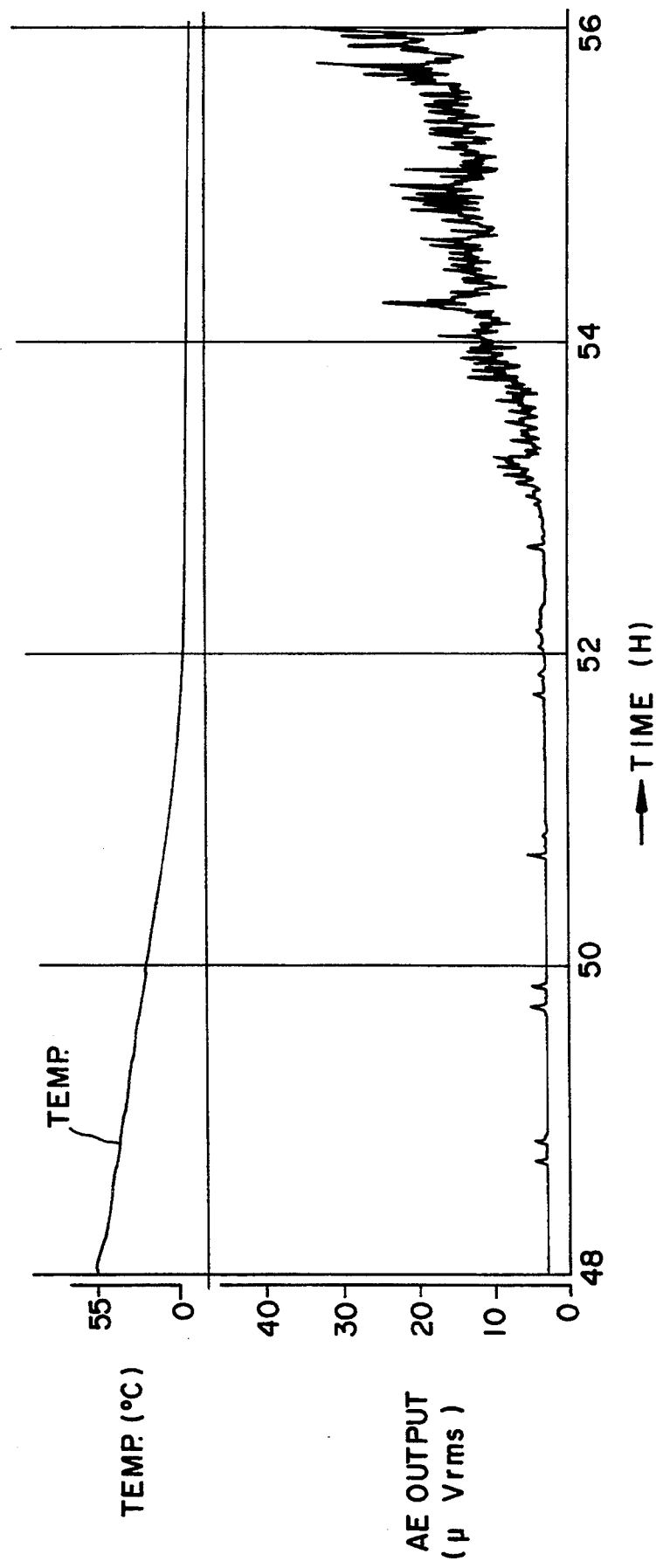
Figure 6:
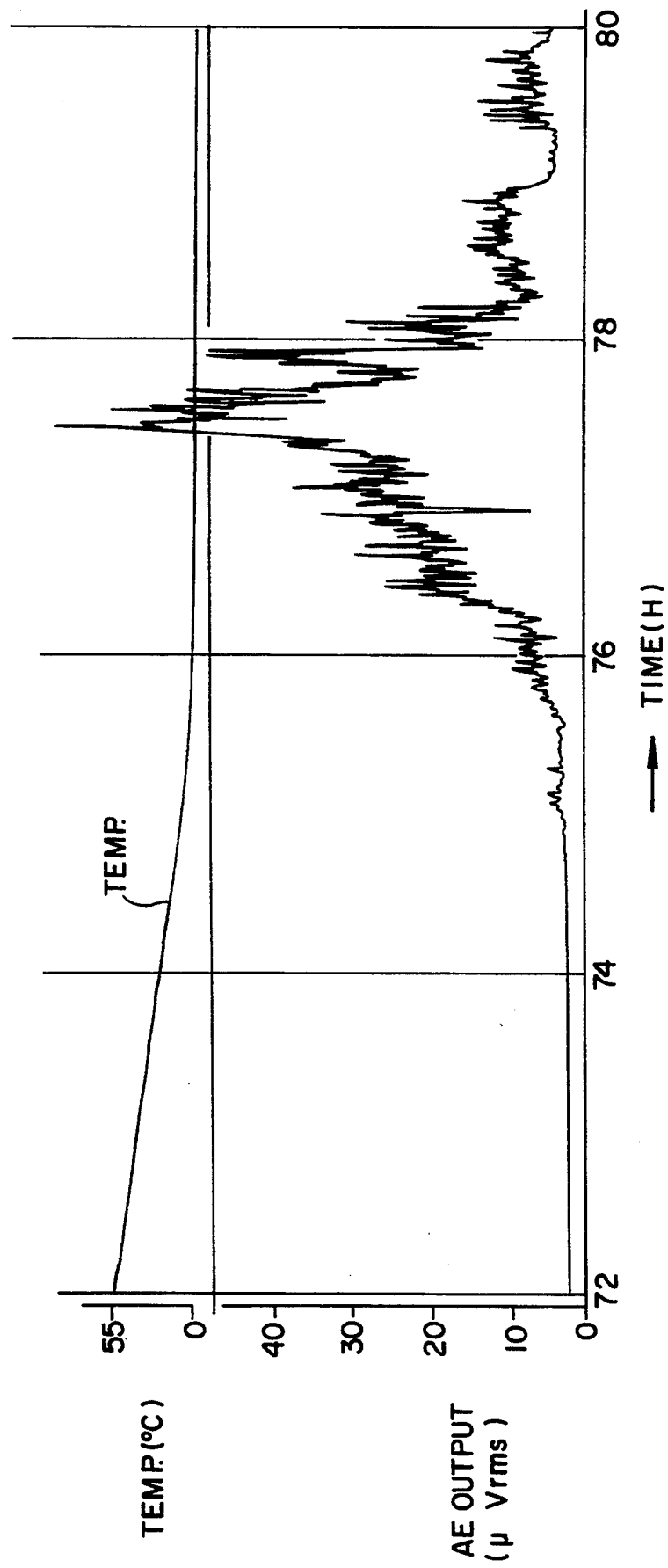
Figure 7:
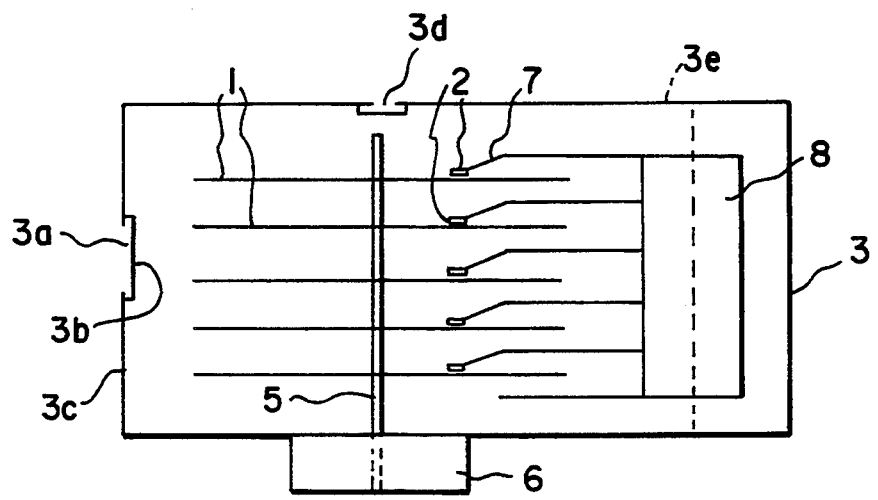
Figure 8:
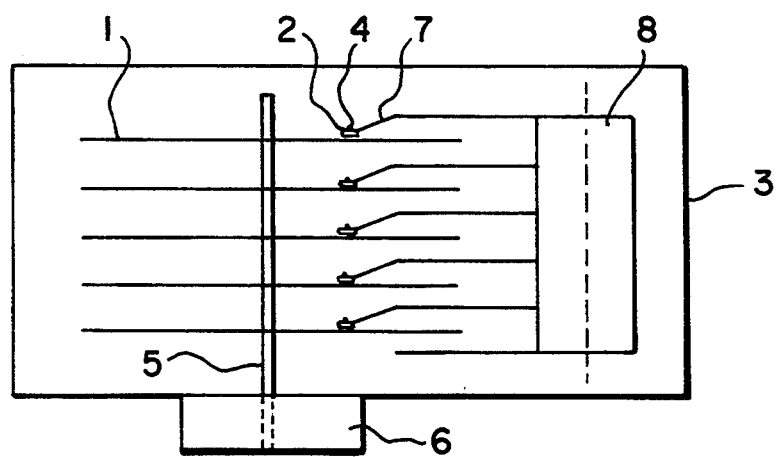
Figure 9:
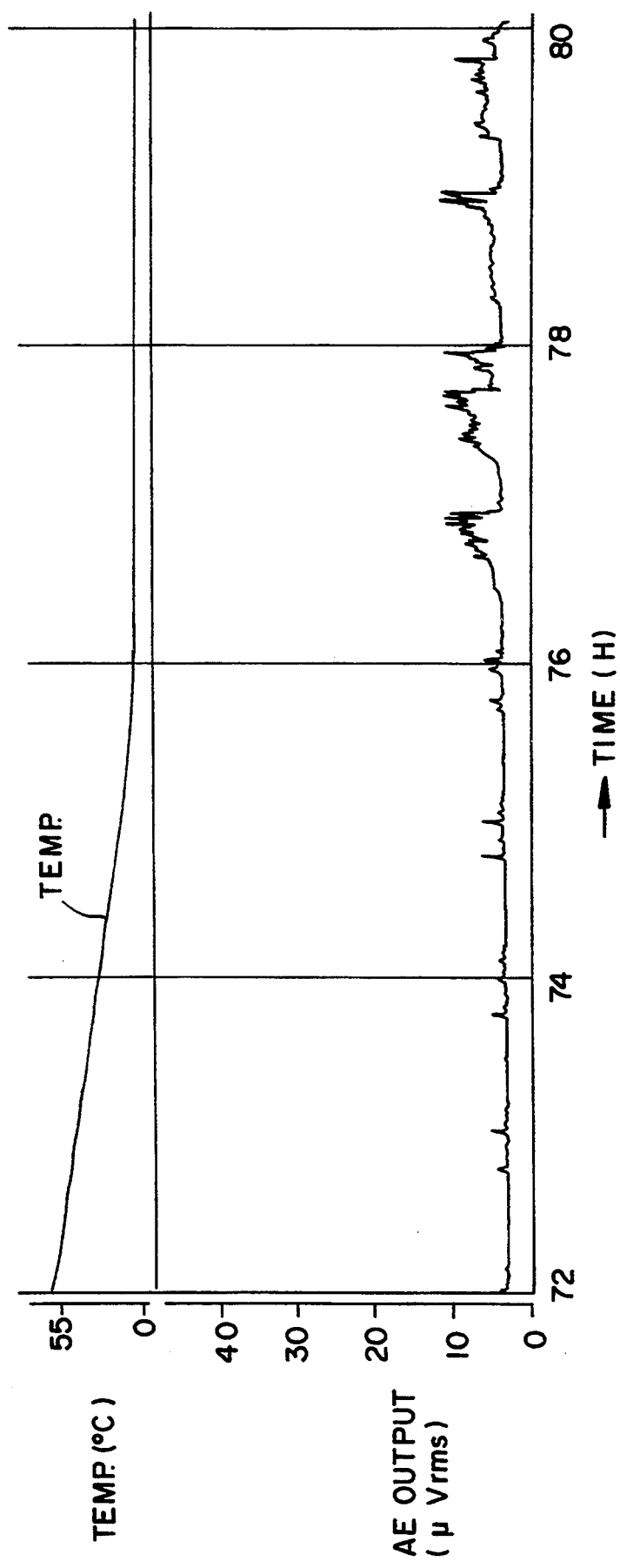

FIGS. 2 schematically illustrate an experimental apparatus for confirming the contaminative deposition on a slider surface;

FIG. 3 shows a deposition of a contaminative vapor onto the slider surface;

FIG. 4 shows variations in the AE sensor output and the air temperature for the running time within the enclosure, of a second experiment;

FIG. 5 shows variations in the AE sensor output and the air temperature for the running time within the enclosure, of a third experiment;

FIG. 6 shows variations in the AE sensor output and the air temperature for the running time within the enclosure, of a fourth experiment;

FIG. 7 schematically illustrates a first preferred embodiment of the present invention;

FIG. 8 schematically illustrates a second preferred embodiment of the present invention: and FIG. 9 shows variations in the AE sensor output and the air temperature for the running time to prove the effect of baking silicone rubber.

DESCRIPTION OF THE PREFERRED EMBODIMENTS

For realizing the invention, the present inventor has experimentally analyzed that the major cause for the slider contacting the disk is surface contamination of the slider and the disk generated during the field operation of the disk. In particular, a contaminative vapor can condense upon a slider surface facing the disk due to the high air pressure used to float the slider.

Figure 1:
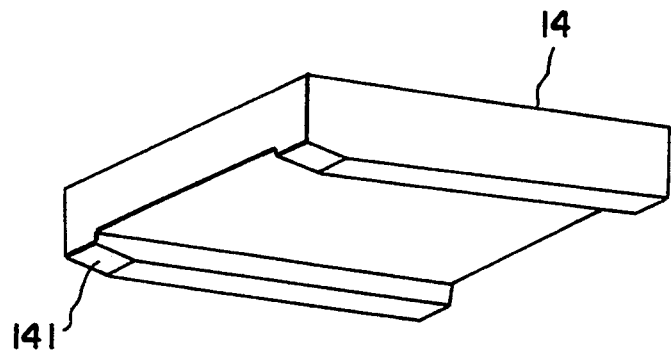
FIG. 1 shows a slider formed for floating on a rotating disk (not shown)

As shown in FIG. 1, a slider 14 which supports a floating type magnetic head (not shown in the figures) is generally provided with a taper 141 facing the disk surface at an air inlet side, where air pressure Is as high as 1.5 to 2 times of the ambient air pressure depending on the slider shape and the disk speed. This fact was reported in, for example, "Performance Characteristics of the IBM 3380K Air Bearing System" on Tribology and Mechanics of Magnetic Storage Systems, Volume V. p.117, 1988. In magnetic disk apparatuses having the floating type heads, there are some constituent members which undesirably release vapors which may condense on, as well as contaminate, the slider and the disk surfaces. Typical examples of the vapors are siloxane, which represents $(R_2SiO_2)_n$, or DOP (dioctyl phthalate), included in silicone rubber which has been employed as a packing material, and various aliphatic carbohydrates.

Each of the partial vapor pressures $P_x$ of these contaminative vapors is lower than the saturated vapor pressure $P_s$ at a certain normal operating temperature, causing no condensation of the contaminative vapor. However, on the slider surface the air pressure (n atm.) can be high enough to be above the saturated vapor pressure. This over-saturated condition may cause the condensation, i.e. liquidization, of the contaminative vapor. This condition is such that the component represented by ΔP condenses when $$\Delta P = nP_x - P_s > 0.$$

The temperature of the slider is also a factor in causing the condensation. Even if at a certain high temperature $T_h$ the partial vapor pressure is below the saturated vapor pressure as $P_{sh}$, the condition may change to over-saturation at a certain lower temperature $T_l$ because the saturated vapor pressure becomes low as $P_{sl}$, so as to cause the condensation. This over-saturation condition is explained as follows. Partial vapor pressure $P_l$ at the lower temperature $T_l$ is such that:

$$P_l = (T_l/T_h)P_h$$

where partial vapor pressure at the higher temperature $T_h$ is $P_h$. Then, if $P_{sl} < P_l$, the difference component $(P_l - P_{sl})$ condenses in the apparatus, particularly onto the slider surface due to its high air pressure n atm. The actual condensation condition is such that:

$$\Delta P = nP_l - P_s > 0$$

where $P_{sl} \leq P_l < P_h < P_{sh}$.

Thus, the maximum operating temperature $T_h$ and the minimum operating temperature $T_l$ can be factors to determine the allowable maximum and minimum operating temperatures of the system.

Next, experiments to confirm the vapor condensing on the slider surface are hereinafter described. FIG. 2(a) shows an apparatus employed for this experiment. FIG. 2(b) is a block diagram of a measuring system employed therein. A disk 12 coated with a generally used lubricant, a spindle 13 for rotating disk 12, an experimental slider 14 made of a transparent sapphire, a head carriage 15 for supporting and moving slider 14 for seek operations a thermometer 16 and a humidity sensor 17, are provided in an experimental enclosure 11 having a glass window 11a through which the slider is observed from outside the experimental enclosure 11. An acoustic emission sensor (referred to hereinafter as AE sensor) 18 is provided on carriage 15 in order to detect an elastic wave generated by a slider touch to the disk surface. Experimental enclosure 11 is placed in an experimental oven 21 connected with an air source 24 which can control the air temperature and the humidity in the oven. In oven 21, there are also provided a microscope 22 and a television camera 23, both gauged with the seek movement of slider 14, for observing the slider surface facing the disk from back of the slider. Disk 12 is rotated at a predetermined speed, 3600 rpm, and slider 14 is moved at a predetermined seek speed, for example 40 mm/s, respectively, by a control circuit 31. Thermometer 16 and humidity meter 17 detect the temperature and the humidity within enclosure 11, respectively. Video tape recorder (VTR) 32 records the video signal output from video camera 23, together with the time output from a clock 39. Output of AE sensor 18 is monitored by an oscilloscope 33, as well as recorded by a plotter 36 after converted to an effective value by a circuit 37 indicated with RMS. Voltage level of the output of RMS circuit 37, temperature data output from temperature indicator 34 and humid data output from humid indicator 35, are respectively converted to frequencies by voltage-frequency converters 38, and are recorded in a voice channel of VTR 32.

A first experiment was for proving that a vapor in the atmosphere of the slider and the disk can cause a condensation of the vapor at a place where the air pressure is high, by condensing a water vapor onto the slider surface in a highly humid environment. In the first and subsequent experiments, the air pressure in enclosure 11 was kept at 1 atm. Through microscope 22 a video image of the surface of experimental slider 14 was observed from the record of VTR 32. Then, it was found that water is condensed on the tapered portion 141 adjacent to the slider rail portion, along the distribution of the highest air pressure as shown with the shaded portion in FIG. 3. This result indicates that the condensation of the vapor on the slider starts from the tapered portion.

A second experiment was for proving that a contaminative atmosphere around the slider and the disk causes contamination of the tapered portion of the slider, whereby the then thus caused contamination touches the disk surface. The apparatus was first operated so as to float the slider for 72 hours in an as high as 55° C. environment. Next, the temperature was gradually lowered while the output signal of AE sensor 18 was watched as well as the slider surface was observed through the transparent slider. In FIG. 4, the variations in the AE sensor output and the air temperature for the time runs are plotted for the time. It is seen there more AE, output at the lower temperature. Moreover, a contamination is visually found on the tapered portion as well as the adjacent horizontal surface or slider rail 143. After this experiment, the disk surface was tested with X-ray photoelectron spectroscopy. There was found siloxane. These facts imply that the contamination causes the slider to touch the disk. Therefore, the source of the siloxane is believed to be the silicone rubber employed as a packing in the enclosure. Thus, the silicone rubber including the siloxane is most probable to become the source of the contamination.

A third experiment was for causing a head crash as a result of liquid condensation by artificially introducing a contaminative vapor. A silicone rubber piece (not shown in the figure) was placed in enclosure 11 as a source of the contaminative vapor. Next, a slider floating operation was carried out in the enclosure heated as high as 55° C. for 48 hours. Next, the temperature was gradually lowered while the output signal of AE sensor 18 and the slider surface were observed. In FIG. 5, the variations in the apparatus temperature and AE output for the time runs are plotted. It is seen there more AE output at the lower temperature. Moreover, on the tapered portion a contamination was observed similar to that of the second experiment. Then, siloxane was detected from the disk surface as well as the slider surface. It was also confirmed that weight of the silicone rubber piece was reduced by approximately 30 mg, which implies that there was vaporization of the siloxane. This fact indicates that the contamination was supplied from the silicone rubber piece.

A fourth experiment was for causing a head crash by introducing DOP (dioctylphtalate) in place of the artificially introduced contaminative vapor. With a DOP piece (not shown in the figure) in the enclosure 11, a slider-floating operation was carried out at as high as 55° C. for 77 hours. Next, the temperature was gradually lowered while the output signal of AE sensor 18 and the slider surface are observed. In FIG. 6, there are plotted the variations or the apparatus temperature and AE output for the time runs. It is seen in this ease as well that there is more AE output at the lower temperature. On the slider surface, a contamination was observed similar to that of the third experiment.

In the above experiments, it was confirmed that the contaminative vapor in the enclosure deposits on the slider surface facing the disk due to the high air pressure thereon; then, the deposition crashes onto the disk surface, Materials having high vapor pressure at a room temperature, having a vapor pressure which widely varies depending on temperature, having a high viscosity at a room temperature, or being apt to cause an abnormal chemical change, are the contaminative vapors most likely to cause the head crash. The above-mentioned siloxane of a low molecular weight has a high saturated vapor pressure particularly into the air (for example, vapor pressure of octamethylsyclotetrasiloxane $((CH_3)_2SiO)_4$ being $2.0 \times 10^{-3}$ atm. at 30° C.) and is apt to be solidified as $SiO_2$ by heat; therefore, it is likely to cause a head crash. The DOP has a viscosity, as high as approximately 80 cp at a room temperature.

Based on the above experiments, a magnetically recording disk system having a head slider floating from the disk surface according to the present invention is constituted such that the partial vapor pressure of the contaminative material inside an enclosure containing the disk and the head slider is kept below $1/n$ atm., where n is the highest air pressure between the slider and the disk surface indicated by atmosphere pressure (atm.). According to this condition, the air pressure at the slider surface is always below the saturated vapor pressure of the contaminative vapor; therefore, the contaminative vapor never condenses there.

A first preferred embodiment of the invention is schematically illustrated in FIG. 7. A plurality of magnetically recording disks 1 installed on a spindle 5 are contained in an enclosure 3 and are rotated by motor 6 outside enclosure 3. A plurality of magnetic heads and sliders (referred to hereinafter as sliders) 2 are installed on the ends of head arms 7 and are floating over the disk surfaces via air gaps. Other ends of head arms 7 are driven by an actuator 8 so as to trace a track. A ventilation hole 3a filled with a filter 3b is provided on a wall 3c located on a radial side of disks 1 in order to prevent dust invasion thereto. Air containing the contaminative vapor within enclosure 3 is circulated by the rotation of disks 1 so as to hit wall 3c; accordingly, the contaminated air goes out of the enclosure via ventilation hole 3a. Thus, the partial vapor pressure of the contaminative vapor released from the members employed for constituting the disk system in the enclosure is kept below the above cited inventive condition.

If the system is operated at a place where the ambient temperature considerably varies, the temperature condition may be modified such that $$P_h(T_l/T_h) < P_{sl}/n$$

where $T_h$ is maximum operation temperature in Kelvin in the envelope; $P_h$ is partial vapor pressure of the contaminative vapor; and $P_{sl}$ is a saturated vapor pressure of the contaminative vapor at the lowest operation temperature $T_l$ in Kelvin. According to this condition, the contaminative vapor never condenses even when the system temperature becomes the lowest, where the vapor is most likely to condense.

A second ventilation hole 3d is preferably provided on a second wall 3e located on an axial side of the disks 1. The second ventilation hole 3d aids the going-out air to breathe in a fresh air from outside enclosure 3. The sizes of holes 3a and 3d are chosen so as to allow adequate air ventilation to meet the condition of the invention, but narrow enough to prevent dust from coming therein.

A second preferred embodiment of the invention is schematically illustrated in FIG. 8, where each of the sliders 2 is provided with a heater 4 and a thermometer (not shown in FIG. 8) so that the slider temperature is 3° to 15° C. higher than the ambient air temperature in enclosure 3 so as to prevent the contaminative vapor condensation onto the slider. Conditions for preventing the contaminative vapor condensation is such that:

$$nP_s(T) < P_s(T+\Delta T)$$

where n is the highest air pressure at the slider surface; $P_s(T)$ is a saturated vapor pressure of the contaminative vapor at a temperature T in Kelvin in the enclosure; $P_s(T+\Delta T)$ is a saturated vapor pressure of the contaminative vapor at a slider temperature $(T+\Delta T)$; and $\Delta T > 0$.

For an example of the contaminative vapor, octamethylcyclotetrasiloxane $((CH_3)_2SiO)_4$ has a saturated vapor pressure $2.0 \times 10^{-3}$ atm. at 30° C. However, at 40° C. the saturated vapor pressure is $3.8 \times 10^{-3}$ atm., which is about 1.9 times of that of 30° C. On the other hand, the air pressure at the slider surface is 1.5 to 2 times of the ambient pressure; therefore, the vapor condensation on to the slider surface can be prevented by keeping the slider temperature about 10° C. higher than the ambient air temperature. For other vapors of the siloxane family the similar condition can be applied to prevent the condensation. Accordingly about 15° C. temperature difference is adequate as the condition to achieve the effect. DOP vapor has a saturated vapor pressure $4.2 \times 10^{-10}$ atm. at 30° C., while at 40° C. the saturated vapor pressure at 40° C. is $1.7 \times 10^{-9}$ atm., which is about 4 times of that of 30° C. Therefore, a temperature difference about 5° C., at least 3° C., higher than the ambient temperature is adequate as the inventive condition.

Heater 4 of the second preferred embodiment can be employed in combination with the first preferred embodiment.

Though the present invention prevents the deposition of the contaminative vapor onto the slider, it is preferable to bake the contaminative material member, such as the silicone rubber, for example, at about 200° C. for, for example 1 hour, before the silicone rubber member is installed in the system. The effect of this baking could be proved by the result shown in FIG. 9, where the same experiments employing the thus baked silicone rubber was carried out. Fluorocarbon polymers replacing the silicone members were confirmed that there was no head crash even when the ambient temperature was considerably varied.

Thus, according to the present invention there is not produced a very fine particle which is likely to be generated from the solidification of the contaminative vapor, particularly of silicone, to cause the head crash to the disk surface, as in prior arts. This results in a remarkable improvement in the operational reliability in magnetically recording disks of enhanced recording density.

The many features nod advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What I claim is:

1. A magnetically recording disk system comprising:
   a disk for magnetic recording;
   a head for reading and writing a signal on said disk;
   a slider sliding on a surface of said disk, for supporting said head thereon, said slider floating from said disk surface by an air gap;
   an enclosure means for containing constituent members including said disk, said head and said slider, and for maintaining a partial pressure of a vapor of an organic material or an organic material containing a metal element, released from at least one of the constituent members at 1/n of a saturated vapor pressure of said material, where n is a maximum air pressure at the air gap generated by rotation of said disk, the vapor being recalcitrantly released from at least one of the organic material and the organic material containing a metal element into said enclosure means when heated by an operation of said disk system; and
   heating means provided on said slider, for continuously heating said slider during rotation of said disk higher than an air temperature in said enclosure means, wherein
   condensation of the vapor onto said slider is prevented such that contact between said slider and said disk caused by deposition of the vapor onto said slider is avoided.

2. A magnetically recording disk system as recited in claim 1, wherein partial pressures of vapors released from organic material or organic material containing a metal element in at least two members are kept 1/n of respective saturated vapor pressures of materials of the at least two members.

3. A magnetically recording disk system as recited in claim 2, wherein a partial vapor pressure $P_h$ of each of the released vapors at a maximum operating temperature $T_h$ in Kelvin in said enclosure is kept such that:

$$P_h(T_l/T_h) < P_{sl}/n$$

where $P_{sl}$ indicates a saturated vapor pressure of a respective material of each of the at least two members at a minimum operating temperature $T_l$ in Kelvin in said enclosure.

4. A magnetically recording disk system as recited in claim 1, said enclosure further comprising:
   a ventilation hole defined in said enclosure, for ventilating the vapor with external air, whereby the partial pressure of the vapor is kept below 1/n of the saturated vapor pressure of the material.

5. A magnetically recording disk system as recited in claim 1, said enclosure further comprising:
   a plurality of ventilation holes defined in said enclosure, for ventilating the vapor with external air, whereby the partial pressure of the vapor is kept below 1/n of the saturated vapor pressure of the material.

6. A magnetically recording disk system as recited in claim 5, wherein a first one of said plurality of holes is on a first wall of said enclosure located at a radial side of said disk, a second one of said plurality of holes is on a second wall located an axial side of said disk.

7. A magnetically recording disk system as recited in claim 1, wherein each of the constituent members is baked at a predetermined temperature for degassing vapor before being installed in said enclosure.

8. A magnetically recording disk system comprising:
   a disk for magnetic recording;
   a head for reading and writing a signal on said disk;
   a slider sliding on a surface of said disk, for supporting said head thereon, said slider floating from said disk surface by an air gap;
   an enclosure for containing constituent members including said disk, said head and said slider; and
   heating means provided on said slider, for heating said slider continuously during rotation of said disk to higher than an air temperature in said enclosure, whereby a vapor from an organic material or an organic material containing a metal element, in at least one of the constituent members, is prevented from depositing on said slider, the vapor being recalcitrantly released from organic material into said enclosure when heated by operation of said system, the vapor depositing on said slider being likely to cause contact between said slider and said disk,
   wherein a saturated vapor pressure $P_s$ of a vapor of an organic material or an organic material containing a metal element, at air temperature T in Kelvin in said enclosure, is kept such that:

$$n\, P_s(T) < P_s(T+\Delta T),$$

where $P_s(T+\Delta T)$ is saturated vapor pressure at a temperature $T+\Delta T$; $\Delta T > 0$: and n is a maximum air pressure at said air gap indicated by atmosphere pressure; and
   wherein vapor deposition on said slider which is likely to cause the slider to contact the disk surface is prevented.

9. A magnetically recording disk system as recited in claim 8, wherein a temperature of said slider is 3° to 15° C. higher than the air temperature.

10. A magnetically recording disk system as recited in claim 8, wherein the vapor being recalcitrantly released from the material into said enclosure when at least one of the constituent members is heated by operation of said system.

11. A magnetically recording disk system as recited in claim 10, wherein saturated vapor pressure $P_s$ of vapors released from organic material or organic material containing a metal element in at least two members are kept such that:

$$n\, P_s(T) < P_s(T+\Delta T).$$

12. A magnetically recording disk system as recited in claim 8, said enclosure further comprising:
   a ventilation hole defined in said enclosure, for ventilating the vapor with external air, whereby the partial pressure of the vapor is kept below 1/n of the saturated vapor pressure of the material.

13. A magnetically recording disk system as recited in claim 8, said enclosure further comprising:
   a plurality of ventilation holes defined in said enclosure, for ventilating the vapor with external air, whereby the partial pressure of the vapor is kept below 1/n of the saturated vapor pressure of the material.

14. A magnetically recording disk system as recited in claim 13, wherein a first one of said plurality of holes is on a first wall of said enclosure located at a radial side of said disk, a second one of said plurality of holes is on a second wall located an axial side of said disk.

15. A magnetically recording disk system as recited in claim 8, wherein each of the constituent members is baked at a predetermined temperature for degassing vapor before being installed in said enclosure.

16. A magnetically recording disk system comprising:
- a disk for magnetic recording;
- a head for reading and writing a signal on said disk;
- a slider sliding on a surface of said disk, for supporting said head thereon, said slider floating from said disk surface by an air gap;
- an enclosure for containing constituent members including said disk, said head and said slider, wherein a partial pressure of a vapor of an organic material or an organic material containing a metal element, released from at least one of the constituent members is kept below 1/n of a saturated vapor pressure of said material, where n is a maximum air pressure at the air gap generated by rotation of said disk, the vapor being recalcitrantly released from at least one of the organic material and the organic material containing a metal element into said enclosure when heated by an operation of said disk system, the vapor depositing on said slider causing contact with said disk;
- a ventilation hole defined in said enclosure, for ventilating the vapor with external air, whereby the partial pressure of the vapor is kept below 1/n of the saturated vapor pressure of the material; and
- heating means provided on said slider, for continuously heating said slider during rotation of said disk higher than an air temperature in said enclosure, wherein
- condensation of the vapor onto said slider is prevented such that contact between said slider and said disk caused by deposition of the vapor onto said slider is avoided.

* * * * *